(12) United States Patent
Petersen (10) Patent No.: US 11,564,373 B2
(45) Date of Patent: Jan. 31, 2023

(54) SYSTEM AND METHOD FOR HEATING ANIMALS

(71) Applicant: Amos Issac Petersen, Iowa City, IA (US)

(72) Inventor: Amos Issac Petersen, Iowa City, IA (US)

(73) Assignee: FARRPRO, INC., Iowa City, IA (US)

( * ) Notice: Subject to any disclaimer, the term of this patent is extended or adjusted under 35 U.S.C. 154(b) by 650 days.

(21) Appl. No.: 16/411,673

(22) Filed: May 14, 2019

(65) Prior Publication Data

US 2020/0359591 A1    Nov. 19, 2020

(51) Int. Cl.
| | | |
|---|---|---|
| *A01K 1/00* | (2006.01) | |
| *H05B 3/00* | (2006.01) | |
| *A01K 1/02* | (2006.01) | |

(52) U.S. Cl.
CPC .......... *A01K 1/0076* (2013.01); *A01K 1/0218* (2013.01); *A01K 1/0227* (2013.01); *H05B 3/008* (2013.01)

(58) Field of Classification Search
CPC .. A01K 1/0076; A01K 1/0218; A01K 1/0227; A01K 41/00; A01K 41/02; A01K 41/023; A01K 63/06; A01K 63/065; A01K 31/005; A01K 31/18; A01K 31/20; A01K 61/17; H05B 3/008; A61G 11/00; A61G 11/001; A61G 11/003; A61G 11/004; A61G 11/005; A61G 11/006
See application file for complete search history.

(56) References Cited

U.S. PATENT DOCUMENTS

| | | | | |
|---|---|---|---|---|
| 1,197,343 A | * | 9/1916 | Charlesworth | A01K 41/00 237/4 |
| 1,205,332 A | * | 11/1916 | Damon | A01K 31/18 119/304 |
| 1,230,917 A | * | 6/1917 | Maurer | A01K 31/18 119/304 |
| 1,850,657 A | * | 3/1932 | Brower | A01K 31/18 119/303 |
| 1,900,342 A | * | 3/1933 | Hess | A61G 11/00 607/81 |
| 2,732,826 A | * | 1/1956 | Dawson | A01K 1/02 119/482 |
| 3,028,097 A | * | 4/1962 | Johnson | A01K 1/0076 237/14 |
| 3,196,834 A | * | 7/1965 | Hall | A01K 31/18 119/304 |
| 5,167,003 A | * | 11/1992 | Montanari | F24C 14/02 126/19 R |
| 5,308,310 A | * | 5/1994 | Roff | A61B 5/0806 600/21 |
| 6,116,190 A | * | 9/2000 | Kitt | A01K 31/19 119/503 |

(Continued)

*Primary Examiner* — Tien Q Dinh
*Assistant Examiner* — Katelyn T Truong
(74) *Attorney, Agent, or Firm* — Christopher A. Proskey; BrownWinick Law Firm (57) ABSTRACT

A system for heating animals. The heating system uses an elongated curved reflector around an elongated infrared light source to reflect heat off of the elongated curved reflector and onto piglets provided in the piglet creep of a farrowing crate. The system has a reduced thermal gradient to efficiently transfer heat to animals, such as piglets, without overheating other nearby animals, such as sows.

47 Claims, 8 Drawing Sheets

(56) References Cited

U.S. PATENT DOCUMENTS

| | | | | |
|---|---|---|---|---|
| 6,500,111 B1* | 12/2002 | Salmon | ................. | A61G 11/00 |
| | | | | 600/22 |
| 6,506,147 B2* | 1/2003 | Eustace | ................. | A61G 11/00 |
| | | | | 600/22 |
| 6,880,188 B1* | 4/2005 | Schmidt | ............... | A61G 11/008 |
| | | | | 177/144 |
| 6,893,390 B1* | 5/2005 | Mackin | ................ | A61G 11/002 |
| | | | | 600/22 |
| 7,153,285 B2* | 12/2006 | Lauman | ................. | A61M 5/44 |
| | | | | 604/6.08 |
| 9,408,282 B1* | 8/2016 | Springer | .................... | F21V 3/02 |
| 9,778,605 B2* | 10/2017 | Kabata | ................ | G03G 15/2053 |
| 2002/0096984 A1* | 7/2002 | Konishi | .................. | H01K 3/02 |
| | | | | 313/25 |
| 2005/0235922 A1* | 10/2005 | Bryant | ................... | A01K 1/0218 |
| | | | | 119/446 |
| 2006/0079730 A1* | 4/2006 | Getsla | ................... | A61G 11/00 |
| | | | | 600/22 |
| 2009/0159011 A1* | 6/2009 | Santo | .................... | A61G 11/00 |
| | | | | 312/236 |
| 2010/0222638 A1* | 9/2010 | Chilton, III | ............ | A61G 11/00 |
| | | | | 600/22 |
| 2015/0065787 A1* | 3/2015 | Bohnen | ................ | A61G 11/005 |
| | | | | 600/22 |
| 2016/0030616 A1* | 2/2016 | Nariyuki | ................ | A01N 25/34 |
| | | | | 600/22 |
| 2016/0309916 A1* | 10/2016 | Pothen | ................. | A61B 5/0077 |
| 2017/0047887 A1* | 2/2017 | Hilliard | .................... | B64F 1/04 |
| 2017/0135888 A1* | 5/2017 | Wakabayashi | ....... | A61G 11/009 |

\* cited by examiner

SYSTEM AND METHOD FOR HEATING ANIMALS

TECHNICAL FIELD

The disclosed embodiments relate generally to an animal heater and, in particular, to an animal heater for use in association with a farrowing operation to create a microclimate that increases farrowing efficiency and reduces piglet mortality.

BACKGROUND

In a farrowing operation, it is frequently desirable to provide piglets with supplemental heat without overheating, and thereby stressing, the sow. Due to their much higher surface area to volume ratios, more external heat needs to be applied to the piglets than to the sow to keep all of the animals at the optimum temperature. Failure to provide piglets with sufficient external heat may lead to the death of some piglets from chilling, starvation, and disease. While piglets may lie against the sow for warmth, this increases the chances of the sow rolling over and suffocating or crushing the piglets.

Prior art systems for farrowing provide a farrowing crate with separate sow and piglet areas separated by a fence. The piglet area is provided with a heat lamp and/or heat mat to draw the piglets away from the sow to avoid injury or death associated with crushing. Providing separate heating elements for the piglet area draws and warms the piglets without overheating the sow. The fence is provided with metal fingers or other barriers to allow the piglets to pass back and forth between the sow and piglet areas for feeding and heating, while preventing the sow from moving into the piglet area and crushing the piglets.

While prior art farrowing systems provide heating for piglets without overheating the sow, the heating can be uneven. Heat lamps radiate heat isotropically, creating a heating pattern of concentric bands of heating that increase in temperature toward a point directly below the heat lamp. The heating pattern therefore presents a thermal gradient, with temperatures on the outer boundary of the heating pattern being too cold, thereby preventing piglets from receiving efficient heating, and the center of the heating pattern being too warm, potentially subjecting piglets to overheating and burns. Heat lamps therefore generate a net usable area (NUA) between the center and outer boundary of the heating pattern, which may account for only twenty percent of the entire isotropic heating pattern, which, when combined with energy loss of the heat lamp, can translate into a heating efficiently of five percent or less as measured by received energy. Moreover, any unused heat converts into waste heat that must be vented from the farrowing area to prevent nearby sows from overheating.

Heat mats may also be used, either alone, or in conjunction with a heat lamp to heat piglets. One drawback associated with heating mats is the uneven heating they provide. Heat mats are typically constructed of a plastic material into which is embedded a resistive element, such as a wire. When a current is applied across the wire, heat emanates from the wire, creating hotter areas on the heat mat near the embedded wire and cooler areas on the heat mat further away from the embedded wire.

An additional drawback associated with heat mats is their tendency to overheat and burn the piglets if the heat mats are not attached to a thermostat. Even if a heat mat is attached to a thermostat, due to its uneven heating, the heat mat may still burn the piglets if the thermostat is positioned on a cooler portion of the heat mat. Alternatively, the heat mat may insufficiently heat the piglets if the thermostat is positioned on a warmer area of the heat mat near an embedded wire.

Another problem with prior art heat lamps is the frequency of the transmitted infrared light. Most heat lamps operate with a significant portion of their heat energy transmitted in the near-infrared spectrum, which is uncomfortable and potentially harmful for animals and which is blocked by defense mechanisms in the skin making thermal transmission inefficient and ineffective.

Additionally, heat lamps act much like a point source, radiating isotropically, heating the floor below in a concentric gradient pattern with too little heat distributed to animals in the outside bands and often too much heat distributed to the center for comfortable, healthy habitation.

Moreover, the transmission of infrared energy from heat lamps is generally along paths that are incident upon the surface of the skin of animals beneath at various angles proportionate to the distance from a point directly below the centerline of the bulb face. Since the effective thermal transmission efficiency is proportionate to the sine of the angle of incidence upon the surface of the skin, this presents another inefficiency of heat lamps used for warming animals.

As additional heating is added to the piglet area, additional ventilation must be provided to remove waste heat from the sow area. This can result in a wasteful feedback loop: as more air is moved across the sow area, this causes more draft in the piglet area, cooling the piglets, requiring more heat to be applied to the piglet area, and thereby necessitating more heat removal from the sow area.

It would be desirable to provide a heating system to provide piglets with supplemental heat without overheating, and thereby stressing, the sow. It would also be desirable to provide a heating system with a more efficient, more even, heating of the piglets. It would be desirable to provide a heating system with a reduced thermal gradient and a decreased propensity to inadequately heat or, alternatively, burn piglets.

SUMMARY OF THE DISCLOSED SUBJECT MATTER

The deficiencies described above are overcome by the disclosed implementation of an animal heater. The animal heater has an elongated parabolically curved reflector provided around an elongated infrared light source. The elongated infrared light source is positioned so that light emanating from the light source bounces off of the curved reflector. Although the light may emanate from the light source toward the curved reflector in nonparallel rays, the curve of the reflector reflects the light toward the animals in parallel rays.

BRIEF DESCRIPTION OF THE DRAWINGS

The present invention will now be described, by way of example, with reference to the accompanying drawings in which.

DETAILED DESCRIPTION OF THE DRAWINGS

The system and method of the present invention provides a lighting system to provide supplemental heat and additional benefits to animals within an animal area. The system and method described below are distinguished over earlier systems in that the present system provides even heating over a larger area with increased efficiency of thermal transfer from the heat source to the animal. One embodiment of the present system and method uses a reflector and curtains to create a microclimate within the animal area and increase the efficiency of the heating. The microclimate also reduces the undesired escape of heat to unwanted areas, such as nearby animal enclosures, and reduces drafts within the conditioned area.

Figure 1:
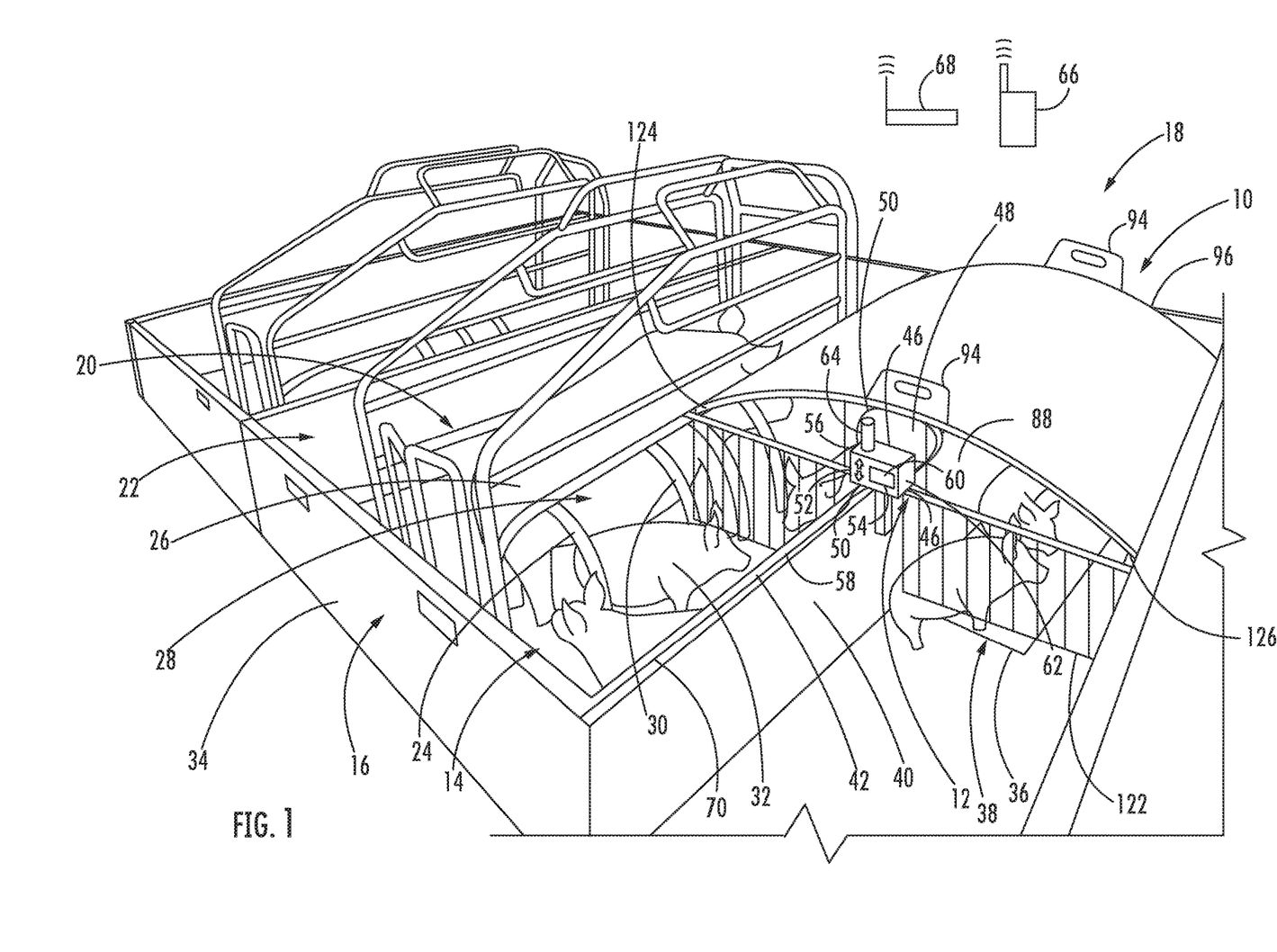
FIG. 1 illustrates a top perspective view of a farrowing operation having multiple farrowing crates using the animal heater of the present invention.
Figure 2:
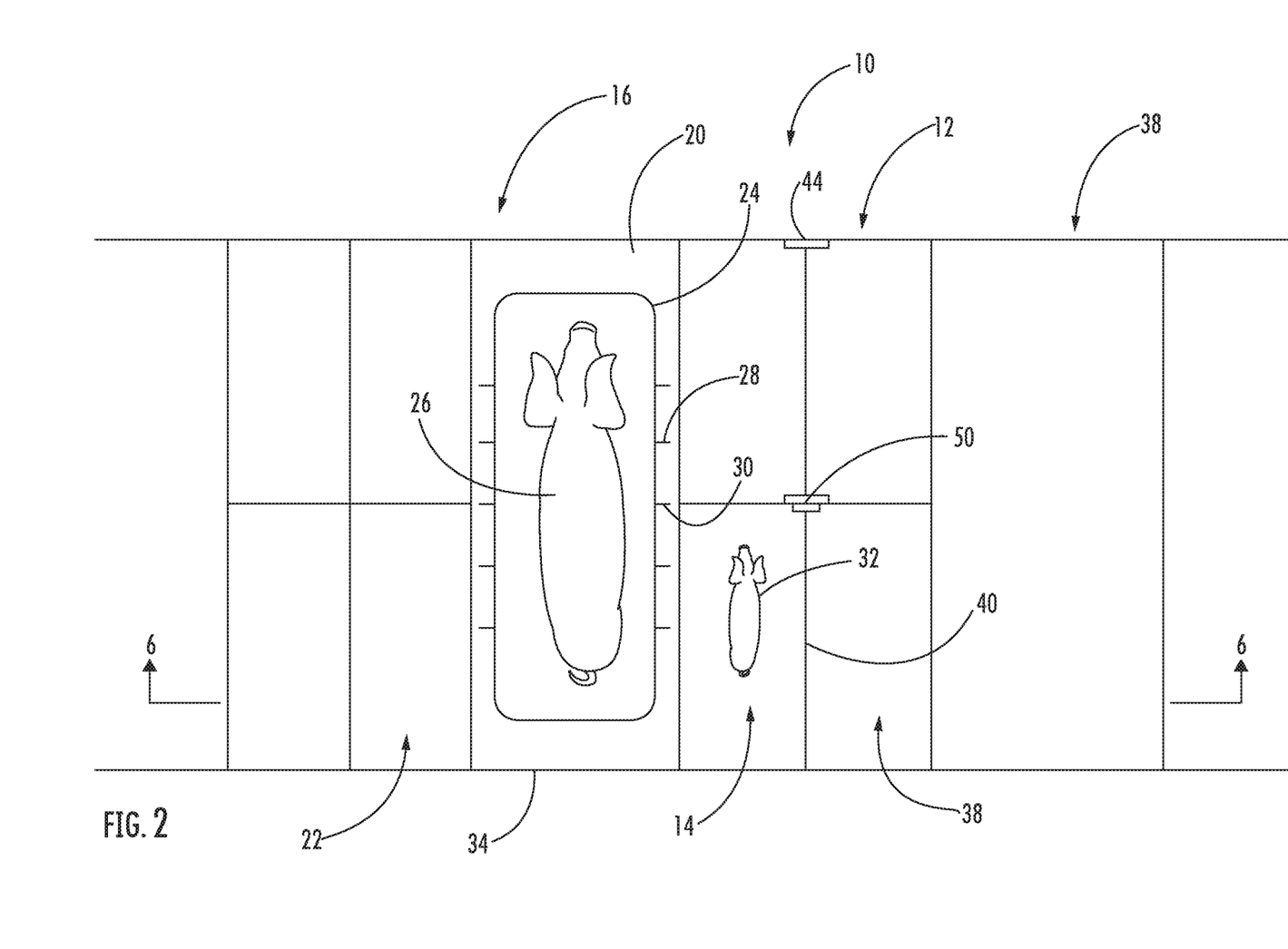
FIG. 2 illustrates a top elevation of a farrowing crate using the animal heater of the present invention.

In FIG. 1, an animal heating system (10) is shown having an animal heater (12) positioned above a piglet area (14), such as a piglet creep, of a farrowing crate (16) located in an animal retention facility, such as a farrowing house (18). Alternatively, the animal retention facility may be a beef operation, a poultry operation, or facility for raising any desired animals. As known in the prior art, the farrowing crate (16) is provided with a sow area (20) in communication with two piglet areas (14) and (22) provided on either side of the sow area (20). Provided around the sow area (20) is a sow barrier, such as a fence (24), to prevent a sow (26) from leaving the sow area (20). The fence (24) includes a comb portion (28) having fingers (30), such as known in the art, to allow piglets (32) to move to the sow area (20) to obtain milk from the sow (26) and then return to the piglet area (14) to obtain heat and avoid being inadvertently crushed by the sow (26). The farrowing crate (16) is surrounded by a wall (34) to contain the piglets (32) within the farrowing crate (16).

As shown in FIGS. 1-4, The animal heater (12) is provided over a portion of the piglet area (14) and over a portion of a piglet area (36) of a contiguous farrowing crate (38) with which the farrowing crate (16) shares a portion of the wall (34) forming a piglet area wall (40) shared by both farrowing crates (16) and (38). Preferably the animal heater (12) is secured to the top (42) of the piglet area wall (40) by a support bracket (50) and a hinged bracket (44). Alternatively, the animal heater (12) may be suspended from the ceiling over the piglet area (14) by chains or cables.

In the preferred embodiment, the support bracket (50) and hinged bracket (44) are both molded of plastic to each define two legs that securely straddle the piglet area wall (40). The legs of the support bracket (50) and a hinged bracket (44) are configured to retain the piglet area wall (40) tightly enough to maintain the animal heater (12) in a desired position, but loosely enough to allow the animal heater (12) to be easily slid along the piglet area wall (40) to any desired position along the wall (40). The support bracket (50) is provided with a curved support shoulder to receive a plastic reflector base (96). The hinged bracket (44) is provided on its upper surface with a hinge, which is coupled to the plastic reflector base (96) in a manner that allows the plastic reflector base (96) to be pivoted off of the support bracket (50) and retained at an angle greater than ninety degrees relative to the piglet area wall (40). The hinged bracket (44) allows the animal heater (12) to be cleaned by tilting the animal heater (12) upwards for power washing and disinfection.

As shown in FIGS. 1-4, the animal heater (12) has a power supply board (46) secured to the support bracket (50). A light assembly (48) is coupled on either end to the support bracket (50) and hinged bracket (44). The power supply board (46) is an AC to DC power supply, such as the 15.6 watt Mean Well RS-15-12 100-240 volt alternating current input, 12 volt direct current 1.3 amp output power supply. The power supply board (46) is provided with a ventilated steel cover (52) and an integrated printed circuit board (54). The printed circuit board (54) is constructed in a manner known in the art to regulate the heat transmitted to the animals therein, to control the frequency and intensity of the light transmitted to the animals therein, to control the heat of a heating mat or other auxiliary heating source which draws power from the system, and to provide an IP-addressable platform for sensors and controls which may be read and managed remotely by the user. The power supply board (46) is also provided with a switch (56) to turn the animal heater (12) on and off. The power supply board (46) is coupled by a wire (58) to a power source (not shown), such as the line voltage available in farrowing houses (18). If desired, the power supply board (46) may be provided with a thermostat (60) having a heat probe (62) provided in the piglet area (14) to monitor the temperature of the piglet area (14) and switch the animal heater (12) on and off as desired to maintain a predetermined temperature input into the thermostat (60). The printed circuit board (54) may be provided with an antenna (64) to allow the power supply board (46) to wirelessly communicate with a mobile device such as a phone (66), or an access point (68) coupled to a network such as the Internet to allow for remote control, data collection, and programming of the animal heater (12). The power supply board (46) is electrically and physically coupled to the light assembly (48) through the support bracket (50).

Figure 3:
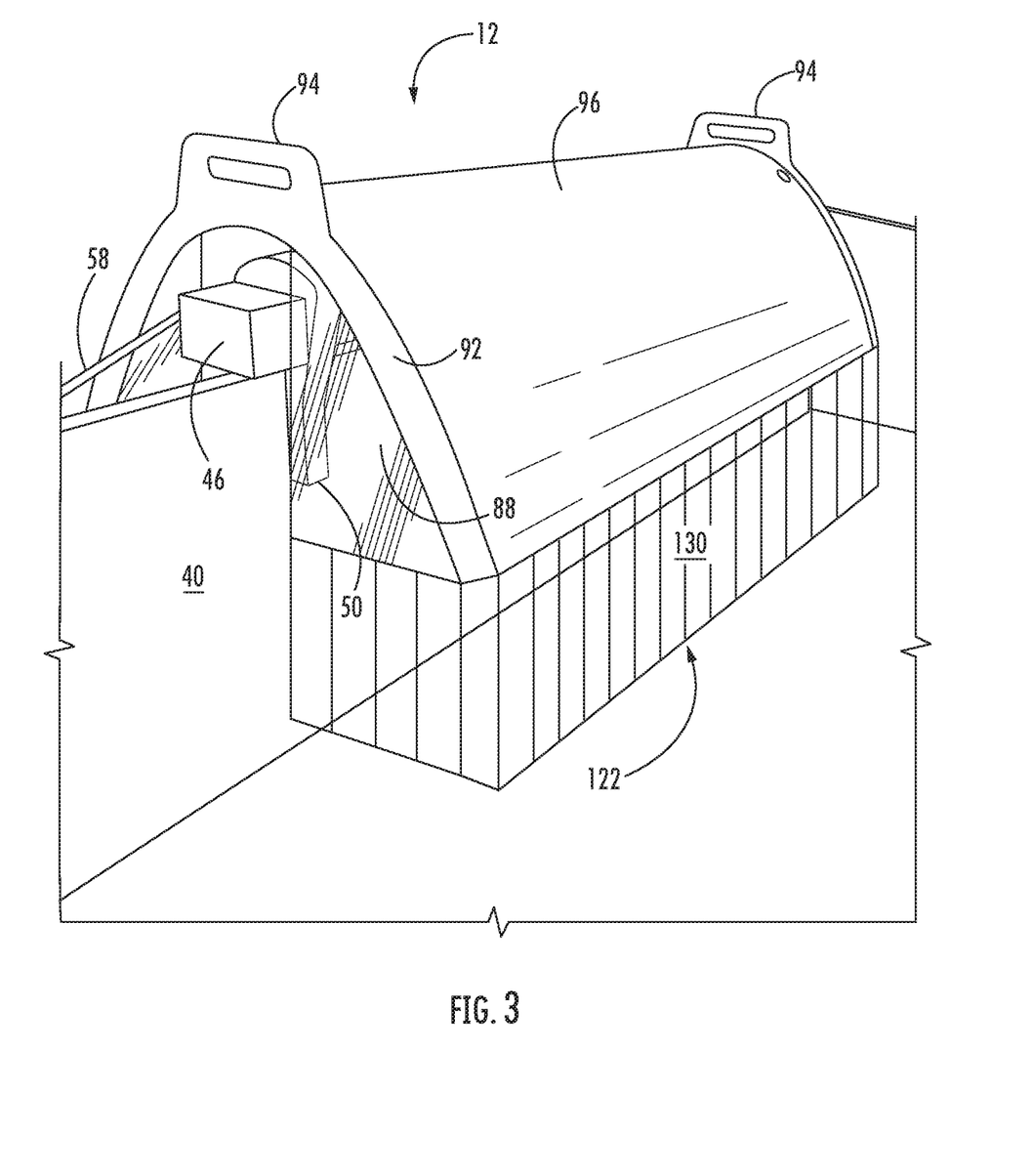
FIG. 3 illustrates a side perspective view of a farrowing crate using the animal heater of the present invention in the operational position.
Figure 4:
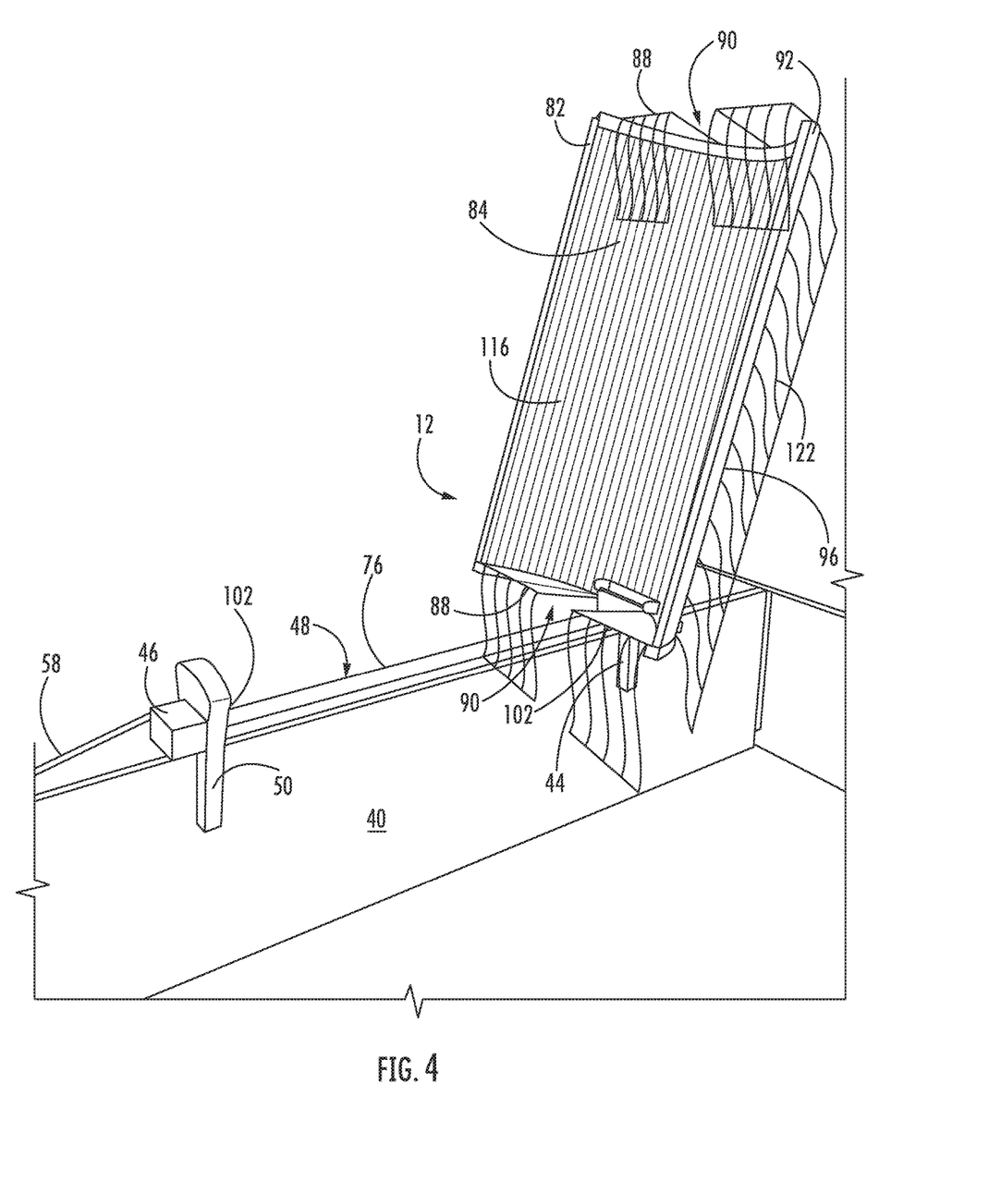
FIG. 4 illustrates a side perspective view of a farrowing crate using the animal heater of the present invention in the raised position.
Figure 5:
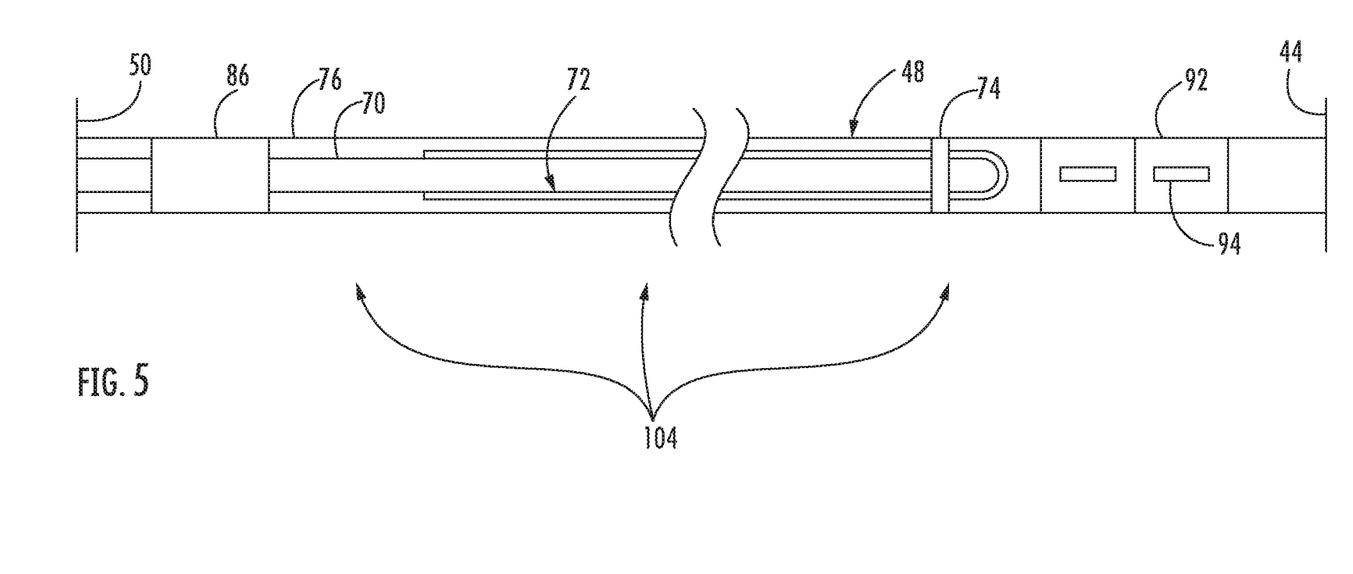
FIG. 5 illustrates a top perspective view of the light assembly of the animal heater of FIG. 1.

As shown in FIGS. 3-5, the light assembly (48) has an infrared heating element (72). While the heating element (72) can be constructed of any desired material, it is preferably constructed of a coiled resistance wire loop, such as a coiled nichrome wire, such as Incoloy 840 in a 0.66 cm coil, that turns back upon itself at a hairpin to form two parallel arms. The heating element (72) is rated for 350 watts, 115 volts, and 37.83 Ohms. From plug to hairpin, the heating element (72) is preferably between 25.4 cm-254.0 cm long, more preferably between 75 cm-125 cm long and most preferably 113.03 cm long. The heating element (72) is preferably between 0.254 cm-2.54 cm in diameter, more preferably between 0.4 cm-0.7 cm in diameter and most preferably 0.635 cm in diameter. Preferably, the last 10.80 cm of the heating element (72) before the hairpin and the first 15.24 cm of the heating element (72) are both constructed of an electrically conductive material that gives off little heat, such as a stiff, standard electrical wire (70).

The heating element (72) may alternatively be a light-emitting diode, or a ceramic infrared heat element, and/or be of any desirable type, number, or construction of heat-generating source. Preferably, the heating element (72) is designed to be used with between 50-1200 watts of electricity, more preferably between 300-600 watts, and most preferably 350 watts. The heating element (72) is provided with a variable modulator, such as the thermostat (60) or an adjustable rheostat coupled to the heating element (72) to adjust the heat output of the heating element (72), preferably from 0 watts to 350 watts.

A glass element is provided at least partially over the heating element (72). The glass element may be of any suitable dimensions and construction. In the preferred embodiment the glass element is a sealed tube (76). The tube (76) is a hollow cylinder constructed of borosilicate glass or other material that allows for the passage of at least some heat and light and which is composed of a material which absorbs higher-frequency infrared light and re-radiates lower frequency infrared light. Positioned over the end of the heating element (72) is a heat-resistant silicone disk (74) with a slot provided in the middle to receive the heating element (72). The silicone disk (74) rests against the interior of the tube (76) and supports the heating element (72), but any material and construction known in the art to support the heating element (72) off the sides of the tube (76) may be used. The tube (76) is preferably provided with an outer diameter of between 15 mm-80 mm in diameter, more preferably between 30 mm-60 mm in diameter and most preferably about 44.5 mm in diameter. The tube (76) is preferably provided with an inner diameter of between 10 mm-75 mm in diameter, more preferably between 20 mm-50 mm in diameter and most preferably about 38.1 mm in diameter. The tube (76) is preferably between 10 cm-300 cm long, more preferably between 50 cm-160 cm long and most preferably 116.84 cm long. The tube (76) is preferably 116.84 cm long to allow for a 15.24 cm portion at either end where the heat-emitting portion of the heating element (72) does not extend.

The tube (76) is provided on each end with a watertight seal to allow the light assembly (48) to be cleaned with a pressure washer (not shown) without damage to items provided within the interior of the tube (76). The heating element (72) preferably provides at least one peak output wavelength of near-infrared or short-wavelength infrared between 0.75-4.5 µm and more preferably between 2.5-4.0 µm. As near-infrared and short-wavelength infrared light are less desirable wavelengths for comfortably transmitting heat to animals, the tube (76) surrounding the heating element (72) converts at least some of the light being emitted by the heating element (72) from near-infrared (0.75-1.4 µm) and/or short/mid-wavelength (1.4-4.5 µm) infrared light to at least one peak output wavelength of mid-wavelength (5-8 µm), long-wavelength (8-15 µm), and/or far (15-1000 µm) infrared light, which is preferable for heating animals. Preferably, the tube (76) surrounding the heating element (72) converts at least some of the light being emitted by the heating element (72) from near-infrared (0.75-1.4 µm) and/or short/mid-wavelength (1.4-4.5 µm) infrared light to at least one peak output wavelength of mid-wavelength (5-8 µm) or long-wavelength (8-10 µm), and more preferably to at least one peak output wavelength of 6.4-8 µm. The heating element (72) may produce light at any desired wavelength, but preferably produces light, either visible or invisible, capable of heating the water within an animal, such as a piglet (32) sufficiently to maintain the animal in a thermoneutral temperature zone, wherein the basal rate of heat production of the piglets (32) is equal to the rate of heat loss of the piglets (32) to the environment. Preferably, the borosilicate glass of the tube (76) converts at least a portion, but preferably at least twenty-five percent, of the light emitted from the heating element (72) from a first wavelength to a second wavelength different that the first wavelength. It is desirable to adjust the thermostat (60) to provide the heating element (72) with 180 watts of power, to allow the heating element (72) to warm the tube (76) sufficiently to the point where the tube (76) radiates light (which also includes infrared light) to provide the piglets (32) with sufficient heat without burning the piglets (32).

A triple LED array (86) is secured to each of the legs of the support bracket (50) and the hinged bracket (44). The LED arrays (86) are directed toward one another and covered with a light diffuser, such as those known in the art to diffuse the light over a wider area. In a preferred embodiment, each of the four LED arrays (86) is an NcLED ECO3 S-LW2-NS LED Module White 0.72 W 10000K 3-LED array manufactured by Samsung. The light from the arrays (86) is provided to help the piglets (32) see and to allow handlers to see the piglets (32) within the heating system (10).

Figure 6:
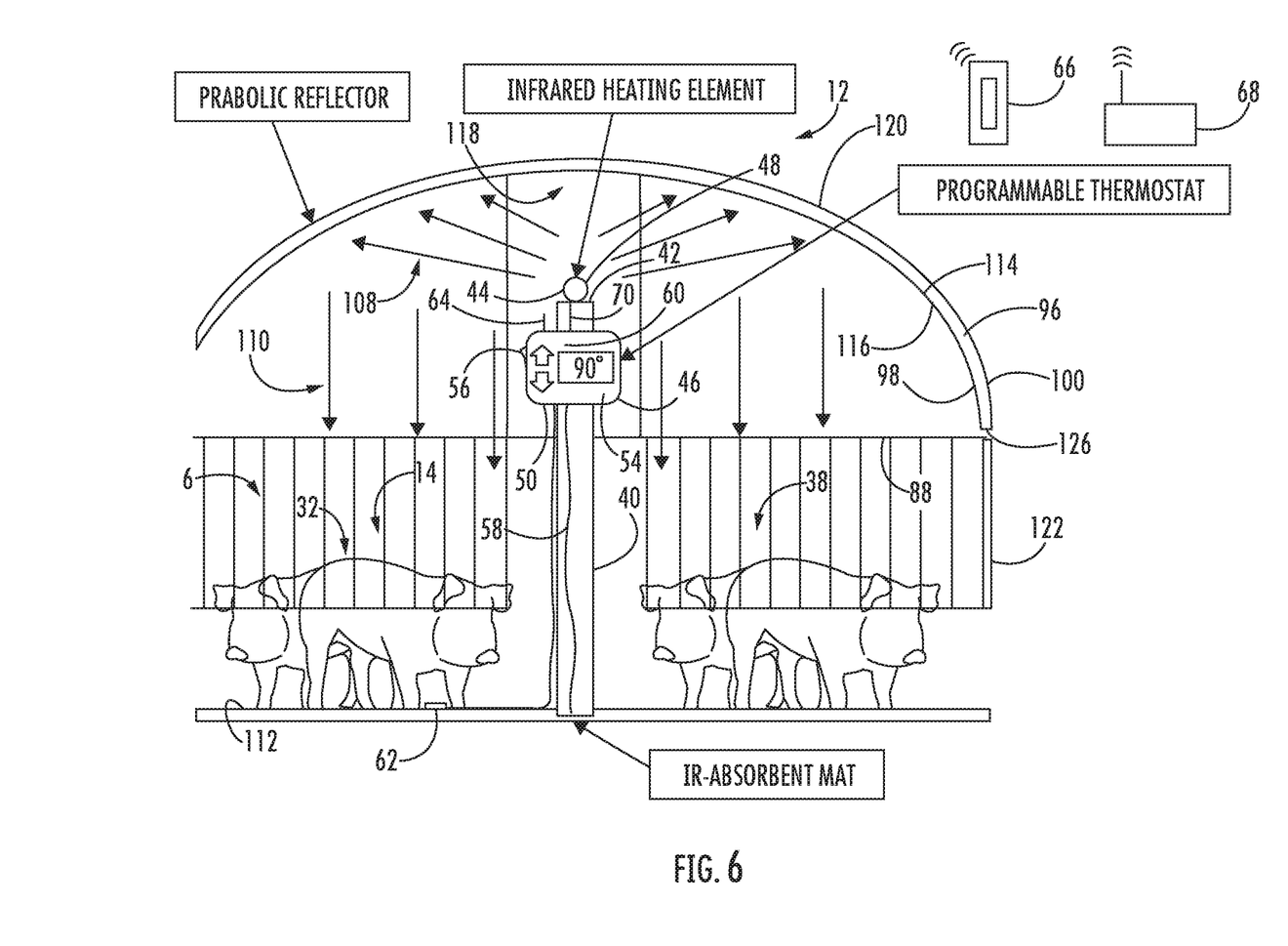
FIG. 6 illustrates a side elevation of a cross section taken along line 6-6 of the farrowing crate of FIG. 2.

As shown in FIGS. 1-4, the curved plastic reflector base (96) of the light assembly (48) is drape-formed fluted polypropylene. The flutes are formed laterally along the housing, but may alternately be formed longitudinally, diagonally, or in a crosshatch. Provided around the curved reflector base (96) is a frame (92) constructed of expanded PVC. The frame (92) defines two handles (94) to allow the heating system (10) to be lifted, tilted, or slid back and forth along the wall (34) of the farrowing crate (16). The frame (92) is secured to the reflector base (96) by nuts and bolts, but may be secured by any fastening system known in the art. Secured to the ends of the frame (92) by bolts or similar securement means are two clear end plates (88), constructed of Lexan® or similar material. Each end plate (88) is provided with a cutout (90) to accommodate the hinged bracket (44) and support bracket (50) when the heating system (10) is positioned over the piglet area (14) of the farrowing crate (16). The curved plastic reflector base (96) defines a bottom face (98) and a top face (100). FIG. 6.

Figure 7:
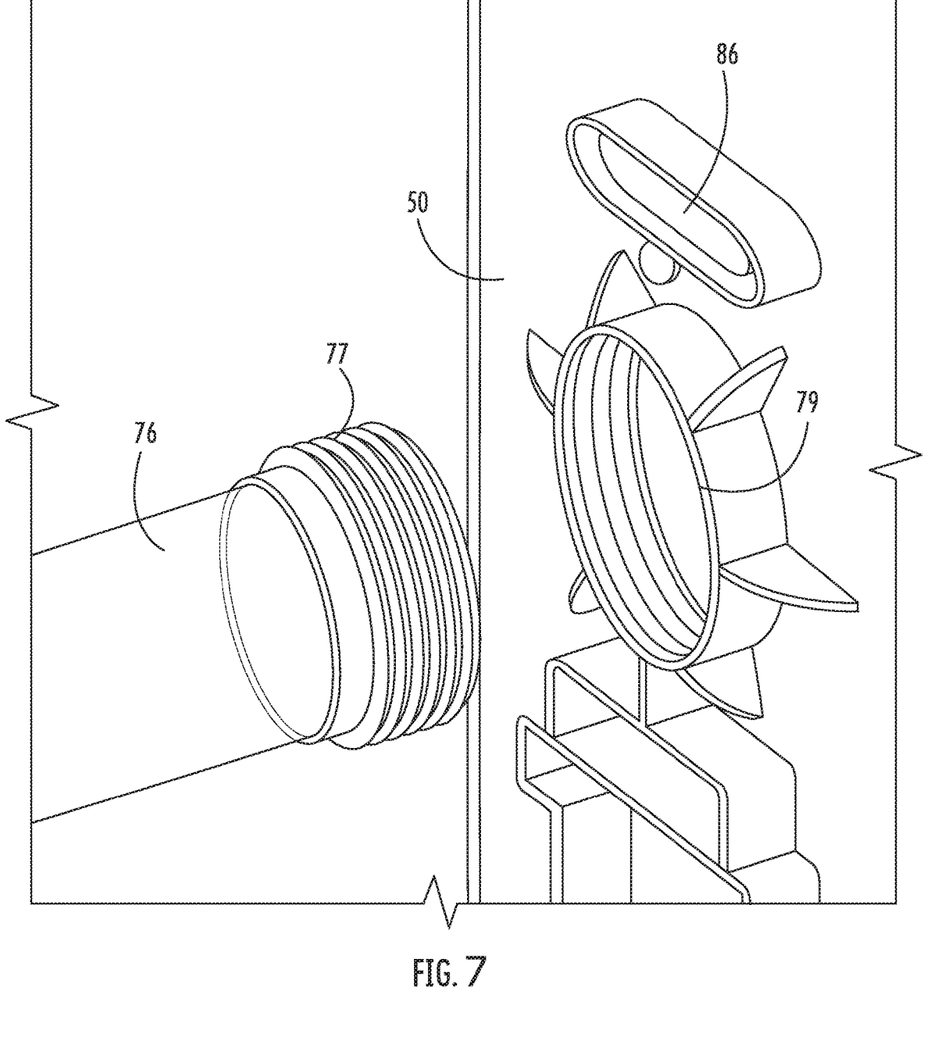
FIG. 7 illustrates a side perspective view of the borosilicate glass tube and threaded collar of the support bracket of the animal heater of FIG. 1.
Figure 8:
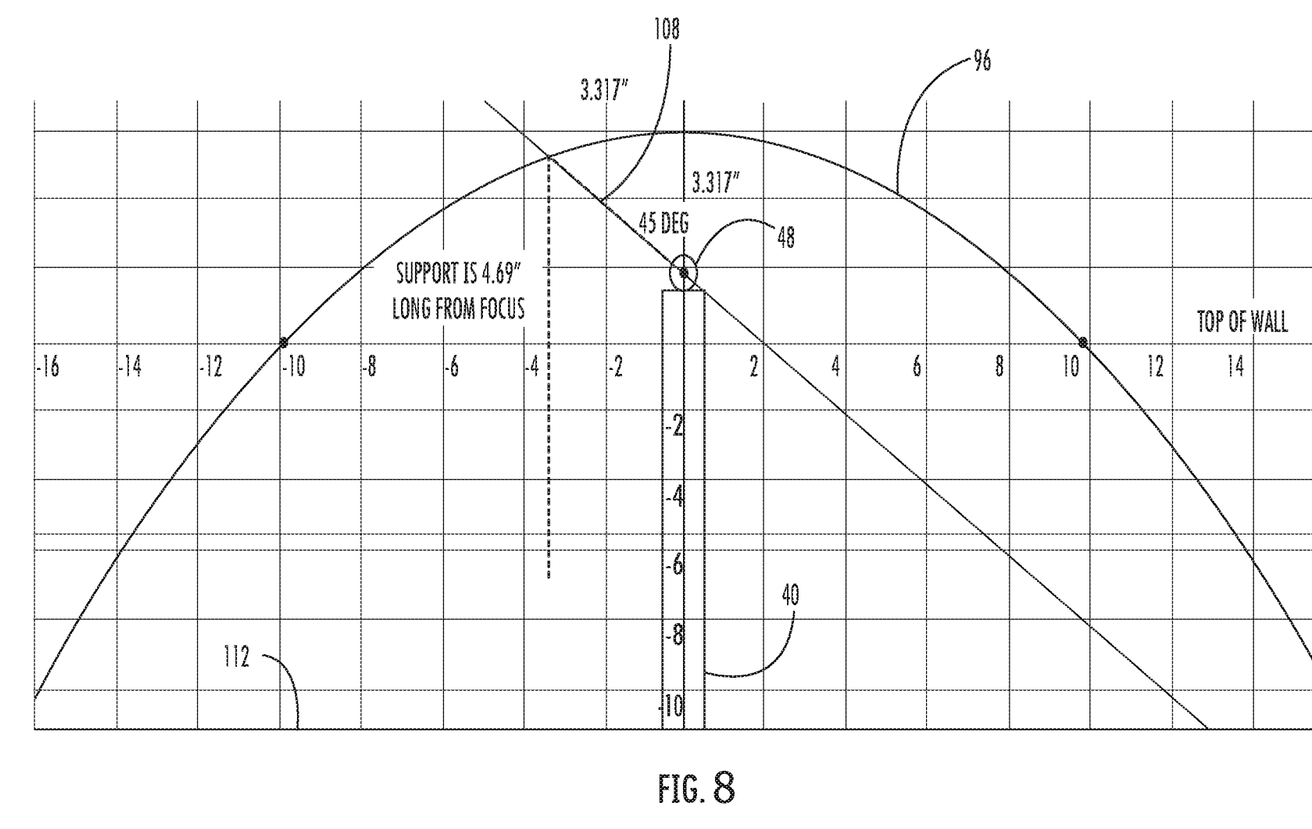
FIG. 8 illustrates a side elevation of the piglet area wall and the light assembly showing the curvature and light reflection of the plastic housing.

The tube (76) of borosilicate glass is provided with threaded ends (102). FIGS. 4-5, and 7. The threaded ends (102) of the tube (76) are threadably received in threaded collars that are, in turn, secured to the support bracket (50) and hinged bracket (44), to position the tube (76) over the center wall (40) separating the two farrowing crates (16) and (38). The plastic reflector base (96) is provided with a parabolic cross-section, defining a curvature sufficient to reflect non-parallel light rays (108) emitting from the lighting elements (104), including the heating element (72) and the tube (76), downward toward the piglets (32) in parallel rays (110), normal to the floor (112) of the piglet area (14). As shown in FIG. 8, the curvature of the plastic reflector base (96) may be defined by the equation $x^2=4fy$ for some focal length (f) greater than 0. Alternatively, the curvature of the plastic reflector base (96) may be any curvature that reflects the non-parallel light rays (108) from the lighting elements (104) toward the floor (112) as parallel light rays (110) having an infinite focus. FIGS. 1 and 5-8.

As shown in FIGS. 3 and 6, secured to the bottom face (98) of the plastic reflector base (96), by adhesive (114), or any other securement method known in the art, is a reflective material (116) to create an elongated curved reflector. The reflective material (116) is preferably a reflector (82), such as a 1 mm thick sheet of polished or polyester coated aluminum such as that known in the art. Secured between the reflective material (116) and the reflector base (96) is a radiant barrier (84), such as a 1 cm thick piece of polypropylene and aluminum "double bubble" roof insulation, such as that known in the art. Alternatively, the curved plastic reflector base (96) may be stamped out of metal, extruded out of metal or plastic, or thermoformed or blow-molded out of plastic. Alternatively, the bottom face (98) of the plastic reflector base (96) may be painted with a reflective paint, electroless chrome plated, or otherwise provided with a reflective material. If desired, the curved opaque polypropylene reflector base (96) itself may be constructed all or part of a reflective material to create the reflector. Preferably, in operation, the bottom face (98) of the plastic reflector base (96) reflects at least 95% of mid-wavelength (3-8 μm), long-wavelength (8-15 μm), and far (15-1000 μm) infrared light. Alternatively, the reflective material (116) may be integrally molded into the plastic reflector base (96).

The light assembly (48) is constructed so that a majority of the light emanating from the lighting elements (104), which comprises the heating element (72) and the LED array (86), is initially directed away from the floor (112) and toward the bottom face (98) of the curved plastic reflector base (96). The curved plastic reflector base (96) in turn is constructed and oriented to direct a majority of the light (108) emanating from the lighting elements (104) away from the sow area (20). FIGS. 1, 5, and 6. Preferably the curve (118) of the curved plastic reflector base (96) is constructed of dimensions sufficient to receive a majority of the non parallel light rays (108) from the lighting elements (104) and reflect those rays in a manner parallel to one another and downward at an angle normal to the floor (112) of the piglet area (14) to heat a predetermined portion of an object, such as a piglet (32), on the floor (112) of the piglet area (14) to a predetermined temperature. To maximize heat transfer from the parallel light rays to the piglets (32), it is desirable to position and configure the heating system (10) to direct the parallel light rays reflected off of the curved plastic reflector base (96) toward the piglets (32) in a manner that maximizes the amount of parallel light rays striking the piglets (32) at an angle as close to normal to the surface of the piglets (32) as possible. The wall (40) acts as an elongated shade to prevent light (108) from the lighting elements (104) from traveling downward directly onto the piglets (32), without first reflecting off of the curved plastic reflector base (96).

A disposable plastic cover (120) is provided over the curved plastic reflector base (96) to extend the life of the curved plastic reflector base (96) and provide for easy cleaning. Secured to the sides (124) and (126) of the curved plastic reflector base (96), by screws, hooks or similar fasteners are curtains (122). The curtains (122) are constructed of polyvinyl chloride, and of dimensions similar to curtains known in the art for covering the entrances to walk-in coolers. The curtains (122) extend down from the sides (124) and (126) of the curved plastic reflector base (96) to the floor (112) of the piglet area (14). The curtains (122) are cut from a piece of vinyl 30 cm wide by 122 cm long. The portion of the curtains (122) hanging down from the plastic reflector base (96) are cut into 12 strips, approximately 10 cm wide. The curtains (122) are also secured to hang down from the end plates (88) of the plastic reflector base (96) in a similar manner. The curtains (122) may be constructed in any manner suitable to allow piglets (32) to pass through the curtains (122) while reducing the amount of heat loss across the curtains (122) out of the piglet area (14) and reflecting heat back in toward the microclimate (130) defined by the curtains (122), the plastic reflector base (96), and the center wall (34). The curtains (122) are designed to exclude drafts, and create the semi-enclosed microclimate (130) within the piglet area (14) while still allowing piglets (32) to move back and forth through the curtains (122) to suckle at the sow (26) and return to the piglet area (14) for warmth and protection from potential crushing. The animal heater (12) is configured to heat the piglets (32) sufficiently to maintain the piglets (32) in a thermoneutral zone of temperature. The animal heater (12) is also configured not to heat the sow (26) sufficiently to push the sow (26) beyond the sow's thermoneutral zone. If the sow is heated beyond the thermoneutral zone, the sow (26) may eat less, which can reduce lactation and lead to a decreased weight gain for the piglets (32). Preferably the animal heater (12) is configured to heat the piglets (32) to an internal temperature of 38.3-39.1° Celsius as measured rectally without heating the sow (26) above an internal temperature of 38.6-40.0° Celsius as measured rectally. As the piglets (32) grow they require less external heating to remain in the thermoneutral zone. The animal heater (12) may therefore be adjusted to decrease the amount of supplemental heat supplied to the piglets (32) as the piglets (32) grow.

As shown in FIGS. 1 and 6, the animal heater (12) is provided with a width of between 50 cm-100 cm, preferably 74 cm, and a length between 75 cm-200 cm, preferably 122 cm, to allow the animal heater (12) to span two contiguous piglet areas (14) and (36). The animal heater (12) forms a roof over both piglet areas (14) and (36), further reducing drafts and establishing the microclimate (130) in the two piglet areas (14) and (36).

Although the invention has been described with respect to a preferred embodiment thereof, it is to be understood that it is not to be so limited since changes and modifications can be made therein which are within the full, intended scope of this invention as defined by the appended claims.

What is claimed is:

1. An animal heater, comprising:
an elongated curved reflector;
an elongated light source;
a first bracket;
wherein the first bracket is coupled adjacent a first end of the elongated curved reflector;
wherein the first bracket is configured to receive a partition in an animal retention facility;
a second bracket;
wherein the second bracket is coupled adjacent a second end of the elongated curved reflector;
wherein the second bracket is configured to receive a partition in an animal retention facility;
wherein the elongated light source is constructed and oriented in a manner such that at least a portion of light emitted from the elongated light source is directed upward toward the
elongated curved reflector;
wherein the elongated curved reflector is constructed and oriented in a manner such that at least a portion of the light emitted from the elongated light source and directed upward toward
the elongated curved reflector is directed by the elongated curved reflector downward toward an animal having a surface; and
wherein the elongated light source is of a construction suitable to heat the surface of the animal;
wherein the animal heater is configured to engage a partition in an animal retention facility;
wherein when the elongated curved reflector is raised, the elongated curved reflector is configured to separate from at least one of the first bracket and second bracket;

wherein the first bracket and second bracket are configured to receive the elongated light source;
wherein the elongated light source is positioned adjacent to the partition;
wherein the elongated curved reflector is configured to move between a lowered position and a raised position;
wherein when the elongated curved reflector is moved to a raised position, the elongated light source remains positioned adjacent to the partition.

2. The animal heater of claim 1, wherein the elongated light source is an infrared heating element and a glass element positioned between the infrared heating element and the elongated curved reflector.

3. The animal heater of claim 2, wherein the glass element positioned between the infrared heating element and the elongated curved reflector is at least partially surrounding the infrared heating element.

4. The animal heater of claim 3, wherein the glass element is at least partially constructed of borosilicate glass.

5. The animal heater of claim 2, wherein at least some of the light being emitted by the infrared heating element passes through the glass element, wherein at least a portion of the light being emitted by the infrared heating element provides at least one peak wavelength of 0.75-4.5 µm, and wherein the glass element is of a construction capable of converting at least some of the light being emitted by the infrared heating element from 0.75-4.5 µm wavelength to an output having at least one peak output wavelength of 5.0-10 µm.

6. The animal heater of claim 2, wherein at least some of the light being emitted by the infrared heating element passes through the glass element, wherein at least a portion of the light being emitted by the infrared heating element provides at least one peak wavelength of 2.5-4.0 µm, and wherein the glass element is of a construction capable of converting at least some of the light being emitted by the infrared heating element from 2.5-4.0 µm wavelength to an output having at least one peak output wavelength of 6.4-9.3 µm.

7. The animal heater of claim 1, wherein the animal retention facility is a farrowing crate.

8. The animal heater of claim 7, wherein the farrowing crate comprises:
a sow area;
a piglet area; and
a sow barrier positioned between the sow area and the piglet area, wherein the sow barrier is of a construction sufficient to allow passage of piglets between the sow area and the piglet area, while preventing passage of a sow between the sow area and the piglet area;
wherein the elongated light source and the elongated curved reflector are positioned above the piglet area; and
wherein the elongated curved reflector is of a construction and orientation capable of directing at least a portion of the light from the elongated light source toward the piglet area in parallel rays.

9. The animal heater of claim 1, wherein the elongated curved reflector is of a construction and orientation capable of directing a majority of the light emitting from the elongated light source toward a piglet area.

10. The animal heater of claim 9, wherein the elongated curved reflector
is of a construction and orientation capable of directing a majority of the light emitting from the elongated light source away from a sow area.

11. An animal heating device comprising:
a curved hood;
the curved hood extending a length between a first end and a second end;
the curved hood extending a width between a first side and a second side;
a first bracket;
wherein the first bracket is coupled adjacent the first end of the curved hood;
wherein the first bracket is configured to receive a partition in an animal retention facility;
a second bracket;
wherein the second bracket is coupled adjacent the second end of the curved hood;
wherein the second bracket is configured to receive a partition in an animal retention facility;
an electronic controller;
the electronic controller having a circuit board;
the circuit board having a microprocessor, sensors, and memory;
wherein the circuit board is configured to regulate heat transmission;
a heating element;
the heating element extending a length between a first end and a second end;
wherein the heating element is electrically coupled to the electronic controller;
wherein the heating element is contained inside a glass tube;
wherein the glass tube is generally cylindrical in shape;
wherein the heating element radiates heat in an outward direction;
wherein the glass tube absorbs heat from the heating element;
wherein the glass tube emits heat absorbed from the heating element in an outward direction;
wherein the curved hood reflects heat emitted from the glass tube downward over an expanded surface area in a generally uniform manner;
wherein when the curved hood is raised, the curved hood is configured to separate from at least one of the first bracket and second bracket;
wherein the first bracket and second bracket are configured to receive the heating element.

12. The animal heating device of claim 11, wherein the curved hood reflects heat over at least a 4 foot area.

13. The animal heating device of claim 11 wherein the sensors are a thermostat.

14. The animal heating device of claim 11 wherein the heating element is sealed within the glass tube to prevent water from entering the glass tube.

15. The animal heating device of claim 11, wherein the animal heating device extends a width between a first side and a second side; wherein the width of the animal heating device is between 50 cm-100 cm.

16. The animal heating device of claim 11, wherein the animal heating device extends a length between a first end and a second end; wherein the length of the animal heating device is between 75 cm-200 cm.

17. The second bracket of claim 11 further comprising a hinge, wherein the hinge facilitates raising and lowering of the curved hood for cleaning purposes.

18. The animal heating device of claim 11 further comprising the second bracket having a hinge, wherein the hinge facilitates raising and lowering of the curved hood for cleaning purposes.

19. The animal heating device of claim 11 further comprising at least one visible light, wherein the at least one visible light is positioned under the curved hood, wherein the at least one visible light is configured to attract animals under the curved hood.

20. The curved hood of claim 11 further comprising at least one handle.

21. The animal heating device of claim 11 wherein the heating element provides at least one peak output wavelength between 0.75-4.5 μm.

22. The animal heating device of claim 11 wherein the heating element provides at least one peak output wavelength between 2.5-4.0 μm.

23. An animal heating device comprising:
a curved hood;
the curved hood extending a length between a first end and a second end;
the curved hood extending a width between a first side and a second side;
a hinge;
the hinge operatively connected adjacent the second end of the curved hood;
wherein the hinge facilitates raising and lowering of the curved hood for cleaning purposes;
a first bracket;
wherein the first bracket is positioned adjacent the first end of the curved hood;
wherein the first bracket is configured to receive a partition in an animal retention facility;
a second bracket;
wherein the second bracket is positioned adjacent the second end of the curved hood;
wherein the second bracket is configured to receive a partition in an animal retention facility;
an electronic controller;
the electronic controller having a circuit board;
the circuit board having a microprocessor, sensors, and memory;
wherein the circuit board is configured to regulate heat transmission;
a heating element;
the heating element extending a length between a first end and a second end;
wherein the heating element is electrically coupled to the electronic controller;
wherein the heating element is contained inside a glass tube;
wherein the glass tube is generally cylindrical in shape;
wherein the heating element radiates heat in an outward direction;
wherein the glass tube absorbs heat from the heating element;
wherein the glass tube emits heat absorbed from the heating element in an outward direction;
wherein the curved hood reflects heat emitted from the glass tube downward over an expanded surface area in a generally uniform manner;
wherein the hinge is configured to operatively engage the second bracket;
wherein the first bracket and second bracket are configured to hold the heating element;
wherein the curved hood is configured to separate from at least one of the first bracket and second bracket;
wherein the first bracket and second bracket are configured to receive the heating element.

24. The animal heating device of claim 23, wherein the curved hood reflects heat over at least a 4 foot area.

25. The animal heating device of claim 23, wherein the sensors are a thermostat.

26. The animal heating device of claim 23, wherein the heating element is sealed within the glass tube to prevent water from entering the glass tube.

27. The animal heating device of claim 23, wherein the animal heating device extends a width between a first side and a second side; wherein the width of the animal heating device is between 50 cm-100 cm.

28. The animal heating device of claim 23, wherein the animal heating device extends a length between a first end and a second end; wherein the length of the animal heating device is between 75 cm-200 cm.

29. The animal heating device of claim 23, wherein the hinge is connected to the second bracket.

30. The animal heating device of claim 23, further comprising at least one visible light, wherein the at least one visible light is positioned under the curved hood, wherein the at least one visible light is configured to attract animals under the curved hood.

31. The curved hood of claim 23, further comprising at least one handle.

32. The animal heating device of claim 23, wherein the heating element provides at least one peak output wavelength between 0.75-4.5 μm.

33. The animal heating device of claim 23, wherein the heating element provides at least one peak output wavelength between 2.5-4.0 μm.

34. An animal heating device comprising:
a curved hood;
the curved hood extending a length between a first end and a second end;
the curved hood extending a width between a first side and a second side;
an electronic controller;
the electronic controller having a circuit board;
the circuit board having a microprocessor and memory;
wherein the circuit board is configured to regulate heat transmission;
a first bracket;
wherein the first bracket is coupled adjacent the first end of the curved hood;
wherein the first bracket is configured to receive a partition in an animal retention facility;
a second bracket;
wherein the second bracket is coupled adjacent the second end of the curved hood;
wherein the second bracket is configured to receive a partition in an animal retention facility;
a heating element;
the heating element extending a length between a first end and a second end;
wherein the heating element is electrically coupled to the electronic controller;
wherein the heating element is contained inside a glass tube;
wherein the heating element is configured to provide heat to piglet areas in a farrowing crate;
at least one visible light;
wherein the at least one visible light is positioned under the curved hood;
wherein the at least one visible light is configured to attract animals under the curved hood;
wherein the heating element radiates heat in an outward direction;
wherein the glass tube absorbs heat from the heating element;

wherein the glass tube emits heat absorbed from the heating element in an outward direction;
wherein the curved hood reflects heat emitted from the glass tube downward over an expanded surface area in a generally uniform manner;
wherein when the curved hood is raised, the curved hood is configured to separate from at least one of the first bracket and second bracket;
wherein the first bracket and second bracket are configured to receive the heating element;
wherein the at least one visible light and the heating element are separate elements.

35. The animal heating device of claim 34, wherein the curved hood reflects heat over at least a 4 foot area.

36. The animal heating device of claim 34, wherein the heating element is sealed within the glass tube to prevent water from entering the glass tube.

37. The animal heating device of claim 34, wherein the animal heating device extends a width between a first side and a second side; wherein the width of the animal heating device is between 50 cm-100 cm.

38. The animal heating device of claim 34, wherein the animal heating device extends a length between a first end and a second end; wherein the length of the animal heating device is between 75 cm-200 cm.

39. The animal heating device of claim 34, further comprising at least one flexible panel, wherein the at least one flexible panel is configured to create a microclimate.

40. The animal heating device of claim 34, further comprising a hinge, wherein the hinge facilitates raising and lowering of the curved hood for cleaning purposes.

41. The curved hood of claim 34, further comprising at least one handle.

42. The animal heating device of claim 34, wherein the heating element provides at least one peak output wavelength between 0.75-4.5 µm.

43. The animal heating device of claim 34, wherein the heating element provides at least one peak output wavelength between 2.5-4.0 µm.

44. An animal heating device comprising:
a curved hood;
the curved hood extending a length between a first end and a second end;
the curved hood extending a width between a first side and a second side;
an electronic controller;
the electronic controller having a circuit board;
the circuit board having a microprocessor and memory;
wherein the circuit board is configured to regulate heat transmission;
a first bracket;
wherein the first bracket is positioned adjacent the first end of the curved hood;
wherein the first bracket is configured to receive a partition in an animal retention facility;
a second bracket;
wherein the second bracket is positioned adjacent the second end of the curved hood;
wherein the second bracket is configured to receive a partition in an animal retention facility;
a heating element;
the heating element extending a length between a first end and a second end;
wherein the heating element is electrically coupled to the electronic controller;
wherein the heating element is contained inside a glass tube;
wherein the heating element is configured to provide heat to piglet areas in a farrowing crate;
at least one flexible panel;
wherein the at least one flexible panel is configured to create a semi-enclosed microclimate;
wherein the heating element radiates heat in an outward direction;
wherein the glass tube absorbs heat from the heating element;
wherein the glass tube emits heat absorbed from the heating element in an outward direction;
wherein the curved hood reflects heat emitted from the glass tube downward over an expanded surface area in a generally uniform manner;
wherein when the curved hood is raised, the curved hood is configured to separate from at least one of the first bracket and second bracket;
wherein the first bracket and second bracket are configured to receive the heating element;
wherein the curved hood is configured to separate from at least one of the first b racket and second bracket so as to facilitate raising and lowering of the curved hood.

45. An animal heating device comprising:
a curved hood;
the curved hood extending a length between two opposable ends;
the curved hood extending a width between a first side and a second side;
a frame;
the frame secured to the curved hood;
an electronic controller;
the electronic controller having a circuit board;
the circuit board having a microprocessor and memory;
wherein the circuit board is configured to regulate heat transmission;
a first bracket;
wherein the first bracket is coupled adjacent one of the two opposable ends of the curved hood;
wherein the first bracket is configured to receive a partition in an animal retention facility;
a second bracket;
wherein the second bracket is coupled adjacent one of the two opposable ends of the curved hood;
wherein the second bracket is configured to receive a partition in an animal retention facility;
a heating element;
the heating element extending a length between a first end and a second end;
wherein the heating element is electrically coupled to the electronic controller;
wherein the heating element is contained inside a glass tube;
wherein the heating element is configured to provide heat to piglet areas in a farrowing crate;
at least one handle;
the at least one handle operably connected to the frame adjacent one of the two opposable ends of the curved hood;
wherein the heating element radiates heat in an outward direction;
wherein the glass tube absorbs heat from the heating element;
wherein the glass tube emits heat absorbed from the heating element in an outward direction;
wherein the curved hood reflects heat emitted from the glass tube downward over an expanded surface area in a generally uniform manner;

wherein when the curved hood is raised, the curved hood is configured to separate from at least one of the first bracket and second bracket;
wherein the first bracket and second bracket are configured to receive the heating element;
wherein the curved hood is configured to separate from at least one of the first bracket and
second bracket so as to facilitate raising and lowering of the curved hood.

46. An animal heating device comprising:
a curved hood;
the curved hood extending a length between a first end and a second end;
the curved hood extending a width between a first side and a second side;
a first bracket;
wherein the first bracket is coupled adjacent the first end of the curved hood;
wherein the first bracket is configured to receive a partition in an animal retention facility;
a second bracket;
the second bracket having a hinge;
wherein the second bracket is coupled adjacent the second end of the curved hood;
wherein the second bracket is configured to receive a partition in an animal retention facility;
at least one visible light;
wherein the at least one visible light is configured to attract animals;
an electronic controller;
the electronic controller having a circuit board;
the circuit board having a microprocessor and memory;
wherein the circuit board is configured to regulate heat transmission;
a heating element;
the heating element extending a length between a first end and a second end;
wherein the heating element is coupled to the electronic controller;
wherein the heating element is contained inside a glass tube;
at least one flexible panel;
wherein the at least one flexible panel is configured to create a semi-enclosed microclimate;
at least one handle operably connected to the curved hood;
wherein the heating element radiates heat in an outward direction;
wherein the glass tube absorbs heat from the heating element;
wherein the glass tube emits heat absorbed from the heating element in an outward direction;
wherein the curved hood reflects heat emitted from the glass tube downward over an expanded surface area in a generally uniform manner to uniformly warm animals below it;
wherein when the curved hood is raised, the curved hood is configured to separate from at least one of the first bracket and second bracket;
wherein the first bracket and second bracket are configured to receive the heating element;
wherein the at least one visible light and the heating element are separate elements.

47. An animal heating device comprising:
a curved hood;
the curved hood extending a length between a first end and a second end;
the curved hood extending a width between a first side and a second side;
an electronic controller;
wherein the electronic controller is configured to regulate heat transmission;
a first bracket;
wherein the first bracket is positioned adjacent the first end of the curved hood;
wherein the first bracket is configured to receive a partition in an animal retention facility;
a second bracket;
wherein the second bracket is positioned adjacent the second end of the curved hood;
wherein the second bracket is configured to receive a partition in an animal retention facility;
a heating element;
the heating element extending a length between a first end and a second end;
wherein the heating element is electrically coupled to the electronic controller;
wherein the heating element is configured to provide heat to piglet areas in a farrowing crate;
wherein the heating element radiates heat in an outward direction;
wherein when the curved hood is raised, the curved hood is configured to separate from at least one of the first bracket and second bracket;
wherein the first bracket and second bracket are configured to receive the heating element;
wherein the curved hood is configured to separate from at least one of the first bracket and second bracket so as to facilitate raising and lowering of the curved hood.

* * * * *